US009636826B2

(12) United States Patent
Liao et al.

(10) Patent No.: US 9,636,826 B2
(45) Date of Patent: May 2, 2017

(54) INTERACTIVE PERSONAL ROBOT

(71) Applicant: HON HAI PRECISION INDUSTRY CO., LTD., New Taipei (TW)

(72) Inventors: Ting-Yi Liao, New Taipei (TW);
Yi-Cheng Lin, New Taipei (TW);
Shih-Pin Lin, New Taipei (TW);
Chang-Da Ho, New Taipei (TW);
Sei-Ping Louh, New Taipei (TW);
Jen-Tsorng Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 33 days.

(21) Appl. No.: 14/802,559

(22) Filed: Jul. 17, 2015

(65) Prior Publication Data

US 2016/0346937 A1 Dec. 1, 2016

(30) Foreign Application Priority Data

May 27, 2015 (CN) .......................... 2015 1 0277067

(51) Int. Cl.
*B25J 9/16* (2006.01)
*B25J 11/00* (2006.01)
*G06K 9/00* (2006.01)
*H04R 1/02* (2006.01)
*G10L 15/22* (2006.01)
*B25J 13/00* (2006.01)
*B25J 19/02* (2006.01)

(52) U.S. Cl.
CPC ......... *B25J 11/0005* (2013.01); *B25J 9/1697* (2013.01); *B25J 13/003* (2013.01); *B25J 19/023* (2013.01); *G06K 9/00664* (2013.01); *G10L 15/22* (2013.01); *H04R 1/028* (2013.01); *G10L 2015/223* (2013.01)

(58) Field of Classification Search
CPC ......... G06F 3/011; G06F 3/017; B25J 11/009; B25J 19/02; B25J 9/163; G05B 2219/36184; Y10S 901/01; Y10S 901/03; Y10S 901/28
USPC ............ 700/245, 250, 257, 259; 318/568.11, 318/568.12, 568.16
See application file for complete search history.

(56) References Cited

U.S. PATENT DOCUMENTS

| 6,505,193 | B1* | 1/2003 | Musgrave | G06F 21/32 |
| 7,983,794 | B2* | 7/2011 | Kawabe | G01S 17/74 |
| | | | | 700/225 |
| 9,330,313 | B2* | 5/2016 | Jung | G06K 9/00671 |
| 2005/0096790 | A1* | 5/2005 | Tamura | G06N 3/008 |
| | | | | 700/245 |
| 2009/0312869 | A1* | 12/2009 | Ohnaka | B25J 9/0003 |
| | | | | 700/253 |

* cited by examiner

*Primary Examiner* — Dalena Tran
(74) *Attorney, Agent, or Firm* — Steven Reiss

(57) ABSTRACT

An interactive personal robot includes a basal body, a memory set in the basal body, a rotating mechanism connected to the basal body, a camera and a microphone assigned on the basal body and a control system set in the basal body. The camera is used to capture an image of a user's eyes. The microphone is configured to record audio of the user. The control system is used to process the image and the audio, to compare the image and the audio processed with the image and audio stored in the memory to gain a corresponding instruction, and to control the rotating mechanism, the rotating mechanism in turn the interactive personal robot to move.

6 Claims, 7 Drawing Sheets

INTERACTIVE PERSONAL ROBOT

FIELD

The subject matter herein generally relates to a robot, and particularly relates to an interactive personal robot.

BACKGROUND

Robots have been created to handle a variety of tasks. Robots are used in the assembly of manufactured goods like automobiles or computers. Robots can be programmed to perform the tasks automatically, in response to operator engagement, or other signals.

BRIEF DESCRIPTION OF THE DRAWINGS

Implementations of the present technology will now be described, by way of example only, with reference to the attached figures.

DETAILED DESCRIPTION

Figure 1:
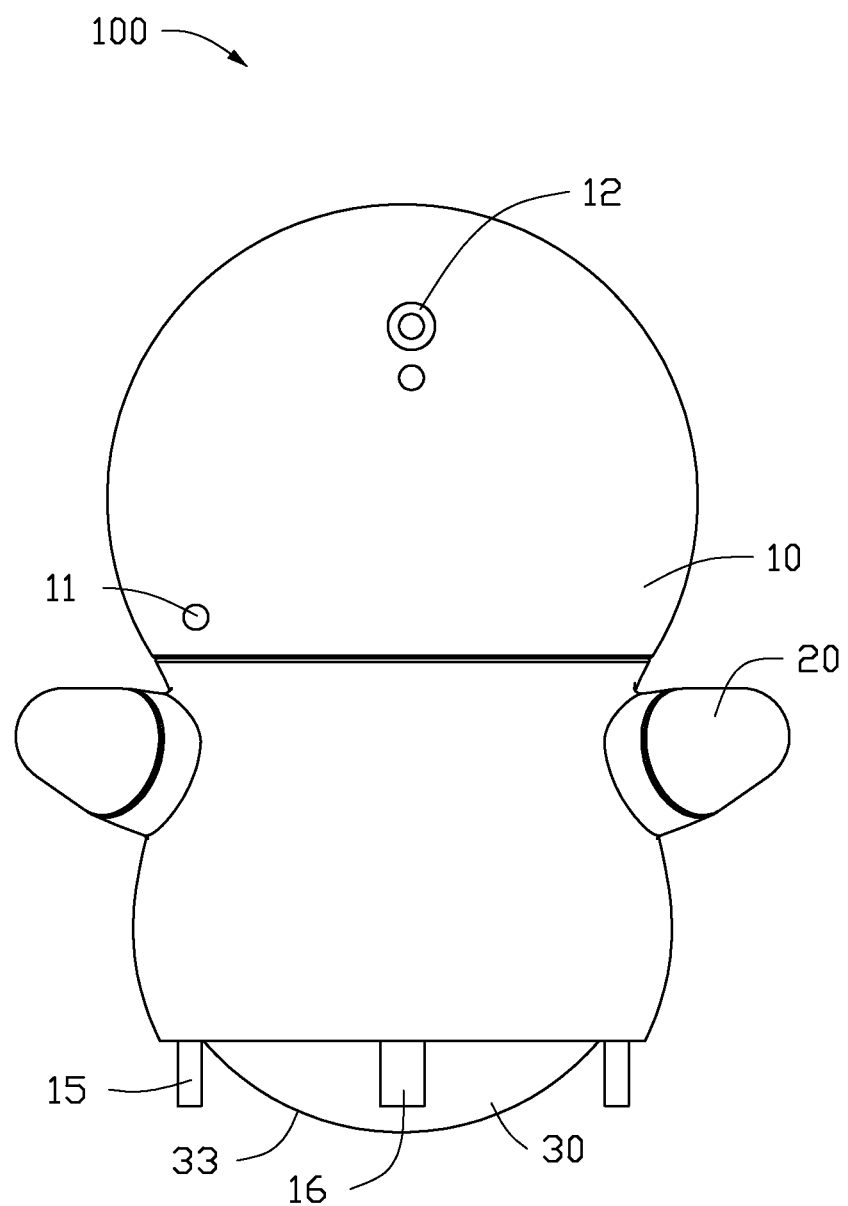
FIG. 1 is a diagrammatic view of an embodiment of an interactive personal robot of the disclosure.
Figure 2:
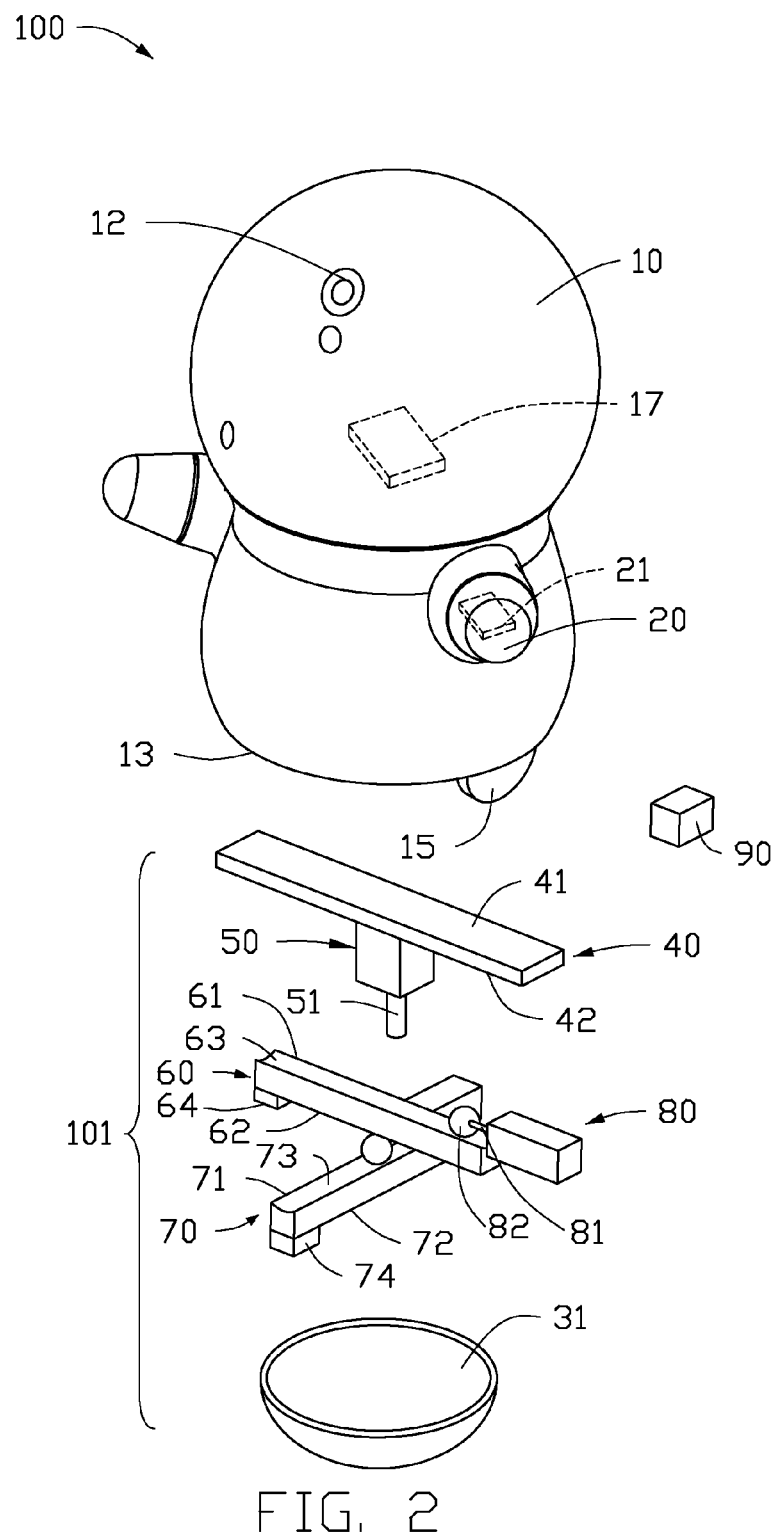
FIG. 2 is an exploded view of the interactive personal robot of FIG. 1.
Figure 3:
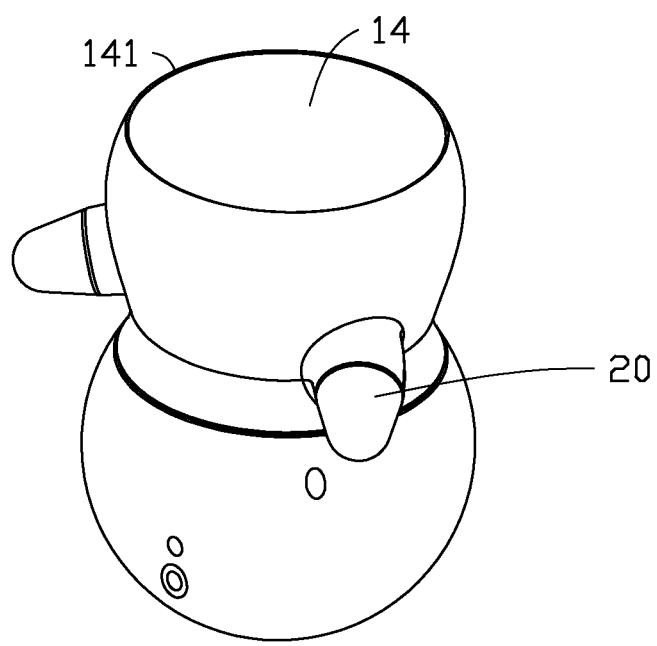
FIG. 3 is an isometric view of a basal body and a protrusion of the interactive personal robot of FIG. 1.
Figure 4:
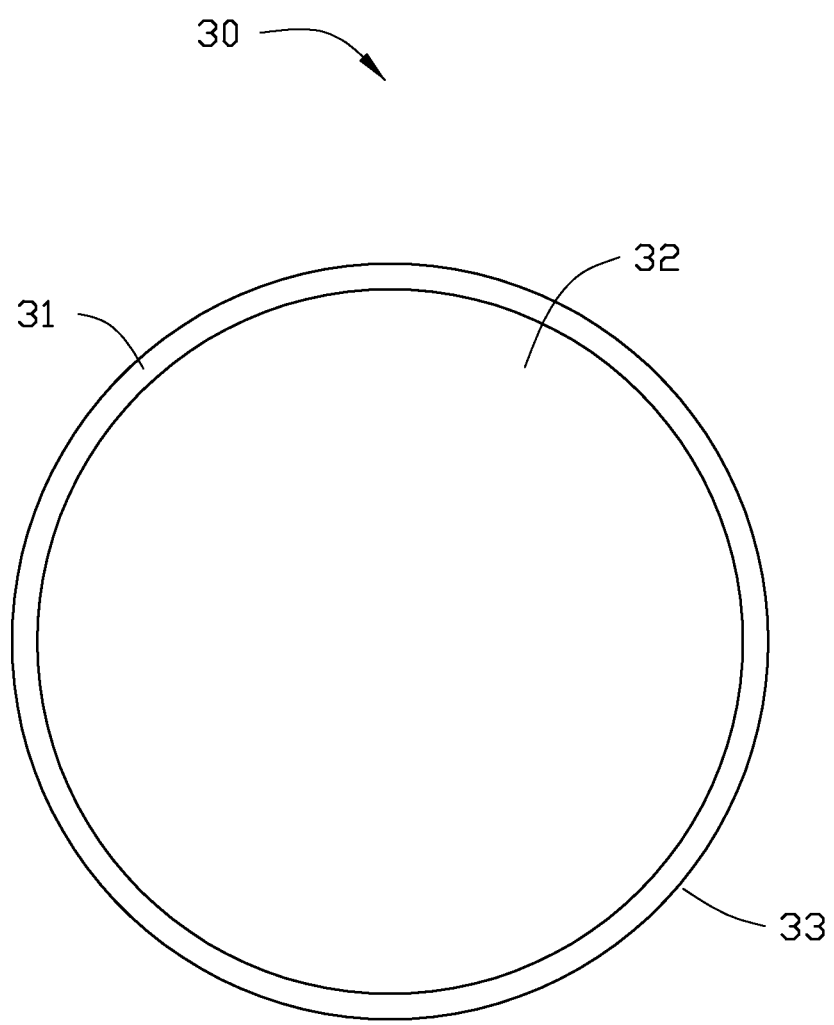
FIG. 4 is a bottom view of a shell of the interactive personal robot of FIG. 1.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to an interactive personal robot.

FIGS. 1-4 illustrate an embodiment of an interactive personal robot 100. The interactive personal robot 100 can be configured to illicit an emotional reaction from a user/observer or exhibit emotional responses. The interactive personal robot 100 includes a basal body 10, two protrusions 20, a shell 30, a bearing plate 40, a first driver 50, a first guide rail 60, a second guide rail 70, two second drivers 80 and a control system 90.

A microphone 11 and a camera 12 are arranged on an outside surface of the basal body 10. The basal body 10 includes an end surface 13 intersecting with the outside surface of the basal body 10. The basal body 10 defines a receiving cavity 14 extending through the end surface 13. The receiving cavity 14 includes a cavity surface 141. Two driving rollers 15 and two universal wheels 16 are set on the basal body 10. In the illustrated embodiment, the two driving rolls 15 and the two universal wheels 16 are located on the edge of the end surface 13 and spaced from each other. The two driving rolls 15 are relative to each other, the universal wheels 16 are also relative to each other. The two driving rolls 15 and the two universal wheels 16 are rotatably connected to the basal body 10. A memory 17 is set in the receiving cavity 14 of the basal body 10 and is configured to store images and audio.

The two protrusions 20 are arranged in the middle of the basal body 10. Each protrusions 20 includes a sensor unit 21. The sensor unit 21 is used to sense touch on the protrusion 20. The number of the protrusion 21 can be changed according to the actual requirement in other embodiments.

The shell 30 is substantially eggshell-shaped. The shell 30 includes a joint surface 31 opposite to the end surface 13 of the basal body 10, an internal surface 32 connected to the joint surface 31 and an outside surface 33 opposite to the internal surface 32 and connected to the joint surface 31. The bearing plate 40 includes a first surface 41 and a second surface 42 opposite to the first surface 41. The bearing plate 40 can be other shapes in other embodiments.

One end of the first driver 50 is connected to a first connecting shaft 51. In the illustrated embodiment, the first driver 50 is a linear motor. In other embodiment, the first driver 50 can be other driver.

The first guide rail 60 is prism-shaped. The first guide rail 60 includes a third surface 61 and a fourth surface 62 opposite to the third surface 61. The third surface 61 defines a first bearing groove 63 passing through the third surface 61. The first bearing groove 63 passes through the opposite two ends of the first guide rail 60 at a direction along the length of the first guide rail 60. A first balance weight 64 is located at an end of the first guide rail 60, and the first balance weight 64 is fixed on the fourth surface 62.

The second guide rail 70 is prism-shaped. The second guide rail 70 includes a fifth surface 71 and a sixth surface 72 opposite to the fifth surface 71. The fifth surface 71 defines a second bearing groove 73. The second bearing groove 73 passes through the opposite two ends of the second guide rail 70. A second balance weight 74 is arranged on an end of the second guide rail 70, the second balance weight 74 is fixed on the sixth surface 72. The structure of the second guide rail 70 and the structure of the first guide rail 60 are the same.

An end of each second driver 80 is connected to a second connecting shaft 81, the second connecting shaft 81 is connected to a ball 82. In the illustrated embodiment, the second driver 80 is a linear driver; the ball 82 is an iron ball.

The second driver 80 can be other driver. The ball 82 can be other balls made of high density material.

Figure 5:
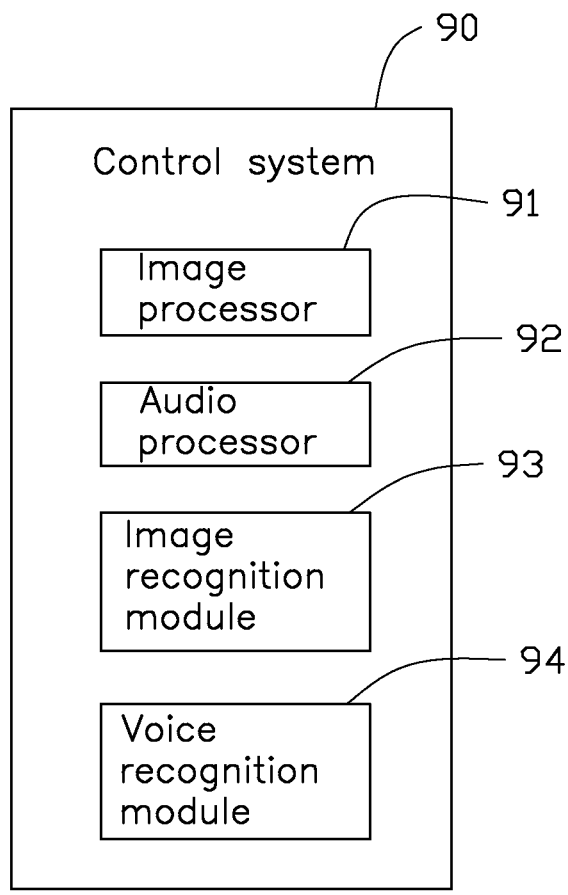
FIG. 5 is a block diagram of a control system of the interactive personal robot of FIG. 1.

Referring to FIG. 5, the control system 90 includes an image processor 91, an audio processor 92, an image recognition module 93 and a voice recognition module 94. The image processor 91 is used to process the image captured by the camera 12. The image recognition module 93 is used to compare the image processed by the image processor 91 with the image stored in the memory 17. The audio processor 92 is configured to process the audio recorded by the microphone 11. The audio recognition module 94 is used to compare the audio processed by the audio processor 92 with the audio stored in the memory 17 to gain a corresponding instruction.

As assembled, the two protrusions 20 are fixed on the outside surface of the basal body 10, the two protrusions 20 are symmetrical relative to the basal body 10. The bearing plate 40 is fixed on the cavity surface 141 of the receiving cavity 14 of the basal body 10, the first surface 41 is away from the end surface 13 of the basal body 10. Two ends of the first guide rail 60 and two ends of the second guide rail 70 are fixed on the cavity surface 141, the first guide rail 60 and the second guide rail 70 form a shape of a cross. The two ends of the first guide rail 60 are located in front and rear direction respectively, the two ends of the second guide rail 70 are located in left and right direction respectively. The first guide rail 60 and the second guide rail 70 are below the bearing plate 40. The second driver 80 is set at an end of the first guide rail 60 opposite to the end which the first balance weight 64 is fixed on, the second driver 80 and the first balance weight 64 are symmetrical relative to the first guide rail 60. The ball 82 is located in the first bearing groove 63 of the first guide rail 60, the second driver 80 drive the ball 82 to slide along the first bearing groove 63 by the second connecting shaft 81. The quality of the first balance weight 64 is corresponding to the quality of the second driver 80. The other second driver 80 is set at an end of the second guide rail 70 opposite to the end which the second balance weight 74 is fixed on, the second driver 80 and the second balance weight 74 are symmetrical relative to the second guide rail 70. The ball 82 is located in the second bearing groove 73, the second driver 80 drive the ball 80 to slide along the second bearing groove 73 by the second connecting shaft 81. The quality of the second balance weight 74 is corresponding to the quality of the second driver 80.

An end of the first driver 50 opposite to the end connected to the first connecting shaft 51 is fixed on the second surface 42 of the bearing plate 40. An end of the first connecting shaft 51 is connected to the internal surface 32 of the shell 30. The first connecting shaft 51 drive the shell 30 to move along a length direction of the first connecting shaft 51, thereby make the shell 30 be token in the receiving cavity 14 of the basal body 10 or make the join surface 31 of the shell 30 to move along a direction away from the end surface 13 of the basal body 10. The diameter of the joint surface 31 is smaller than the diameter of the end surface 13.

The shell 30, the bearing plate 40, the first driver 50, the first guide rail 60, the second guide rail 70, the two second drivers 80, the two driving rollers 15 and the two universal wheels 16 make up a rotating mechanism 101. The rotating mechanism 101 is used to drive the movement, stop and inclination of the interactive personal robot 100. The interactive personal robot 100 can be made up of more or less component in other embodiment.

Figure 6:
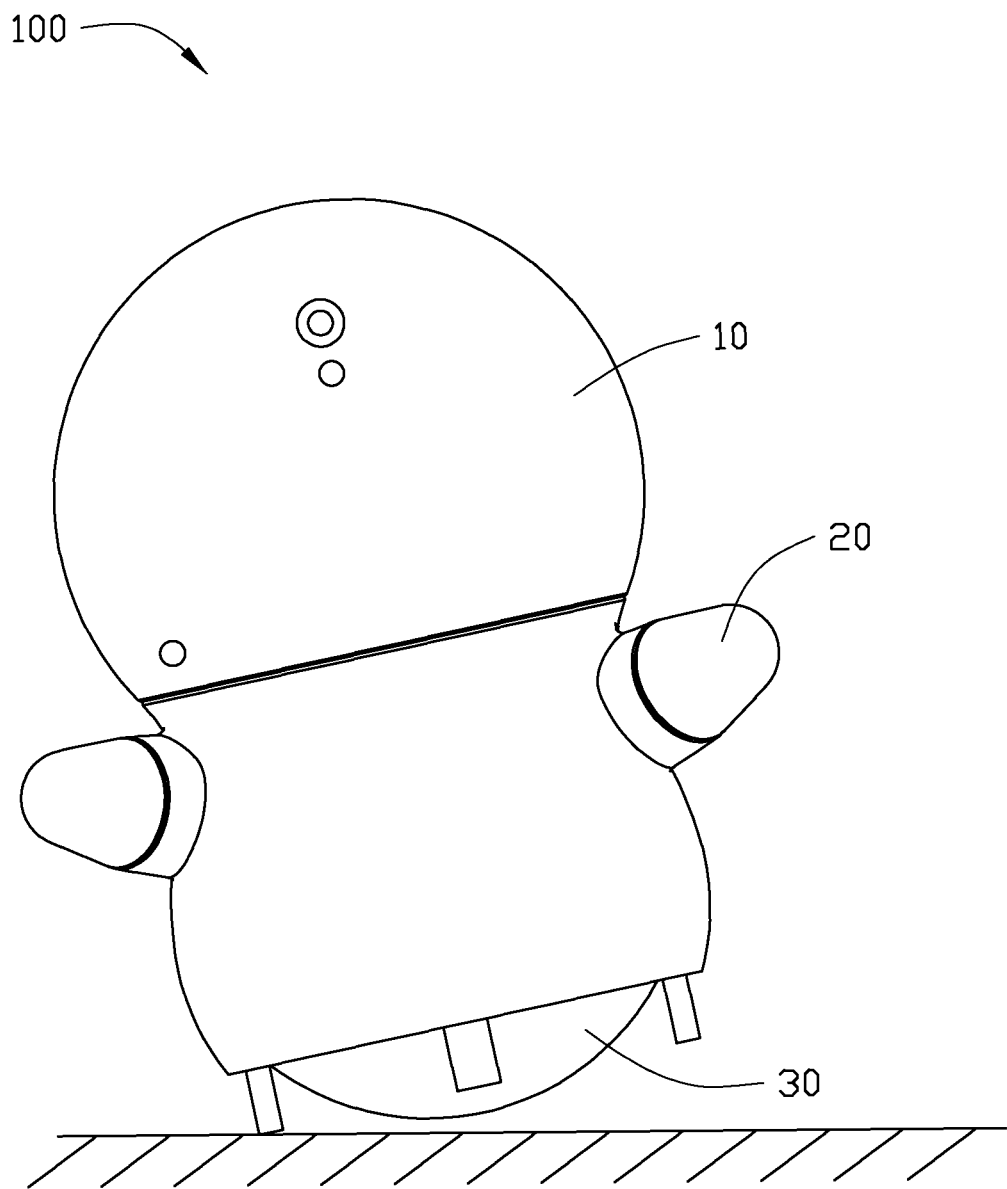
FIG. 6 is a diagrammatic view of the interactive personal robot of FIG. 1 when the interactive personal robot generates a deviation.
Figure 7:
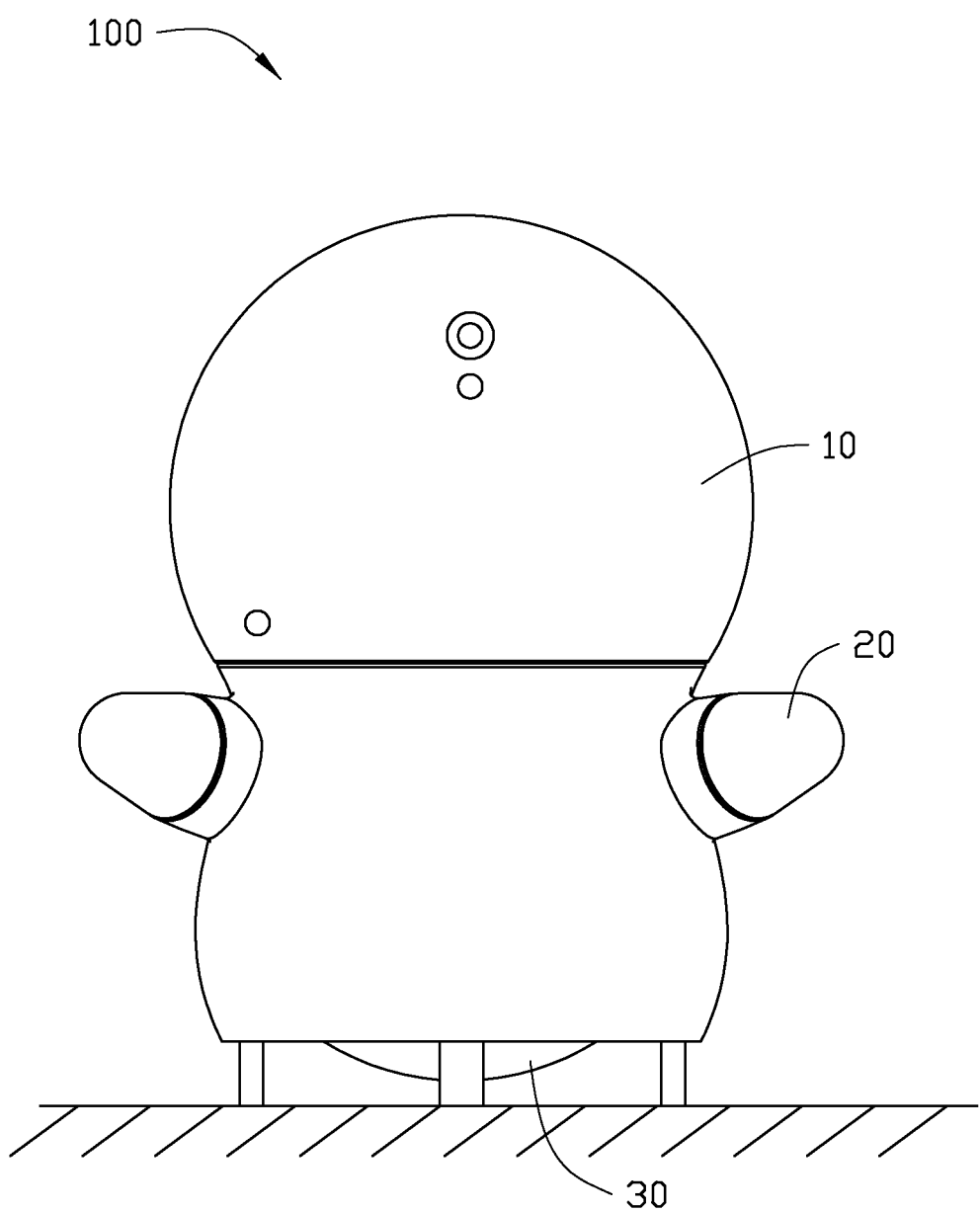
FIG. 7 is a diagrammatic view of the interactive personal robot of FIG. 1 when the interactive personal robot walking.

Referring to FIGS. 6-7, when the interactive personal robot 100 is in an initial state, the barycenter of one of the two balls 82 meets with the geometric center of the first guide rail 60, the barycenter of the other of the two balls 82 meets with the geometric center of the second guide rail 70, the outside surface 33 of the shell 30 of the interactive personal robot 100 touch the ground, the two driving rollers 15, the two universal wheels 16 and the ground are spaced from each other by a predetermined distance.

In operation, when the control system 90 do not receive an instruction information from a user, the control system 90 control the rotating mechanism 101 to drive the interactive personal robot 100 to tilt or rotate to attract the user. When the interactive personal robot 100 is in a state of tilting front and back, the barycenter of the ball 82 located on the second guide rail 70 meets the geometric center of the second guide rail 70. The second driver 80 corresponding to the first guide rail 60 drive the ball 82 to move along the first bearing groove 63 by the second connecting shaft 81 in a first direction. The barycenter of the interactive personal robot 100 move along the movement the balls 82 along the first bearing groove 63, the interactive personal robot 100 tilt along the movement of the ball 82 along the first bearing groove 63. The interactive personal robot 100 stops to tilt when the ball 82 touch the cavity surface 141 of the basal body 10. The second driver 80 corresponding to the first guide rail 60 drive the ball 82 to move in a second direction opposite to the first direction. The interactive personal robot 100 moves reversely. When the barycenter of the ball 82 located on the first guide rail 60 meets the barycenter of the first guide rail 60, the interactive personal robot 100 moves back to the initial state. The ball 82 continue to move in the second direction, the interactive personal robot 100 begin to tilt along the movement of the ball 82 along the first bearing groove 63. When the ball 82 touches the cavity surface 141 of the basal body 10, the interactive personal robot 100 stop to tilt. The ball 82 on the second guide rail 70 can also moves to make the interactive personal robot 100 tilt leftwards and rightwards.

When the barycenter of one of the two balls 82 meets the geometric center of the corresponding one guide rail, the other ball 82 is located on an end of the corresponding other guide rail, the second driver 80 drive the one of the ball 82 to move along the corresponding one guide rail from the center of the corresponding one guide rail to an end of the corresponding one guide rail, and the other ball 82 do not move. In this way, the interactive personal robot 100 begins to rotate along the movement of the one of the ball 82, from an end of the corresponding other guide rail to an end of the corresponding one guide rail.

The camera 12 of the interactive personal robot 100 is configured to capture an image of the user's eyes. The image processor 91 of the control system 90 processes the image of the user's eyes. The image recognition module 93 compares the image processed by the image processor 91 with the images captured previously and stored in the memory 17 to gain the movement directions of the user's eyes, the control system 90 control the second driver 80 corresponding to the second guide rail 70 to drive the ball 82 to move on the second bearing groove 73 according to the movement directions of the user's eyes, the interactive personal robot 100 tilts following the movement of the user's eyes. When the user give instructions of "follow me", the microphone 11 record the audio of the user, the audio processor 92 of the control system 90 processes the audio recorded by the microphone 11, the voice recognition module 94 compares the audio processed by the audio processor 92 with audio stored in the memory 17 to gain the instruction of the user, the control system 90 control the interactive personal robot 100 to move. In the movement of the interactive personal robot 100, the first driver 50 drives the shell 30 to move in a direction away from the ground by the first connecting shaft 51, and makes the two driving rolls 15 and the two universal wheels 16 touch the ground, a driver drives the two driving rolls 15 and the two universal wheels 16 to move, and makes the interactive personal robot 100 move.

When the user give instructions of "stop", the microphone 11 record the audio of the user, the audio processor 92 of the control system 90 processes the audio recorded by the microphone 11, the voice recognition module 94 compares the audio processed by the audio processor 92 with audio stored in the memory 17 to gain the instruction of the user, the control system 90 control the interactive personal robot 100 to stop. At the same time, the first driver 50 drive the shell 30 to move to make the outside surface 33 of the shell 30 touches the ground.

The movement of the shell 30 can be driven in other ways, such as a screw and rack joint.

The embodiments shown and described above are only examples. Many details are often found in the art such as the other features of an interactive personal robot. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An interactive personal robot comprising:
a basal body;
a camera coupled to the basal body and configured to capture an image of a user's eyes;
a microphone coupled to the basal body and configured to record audio of the user;
a memory coupled to the basal body and configured for storing image and audio information;
a rotating mechanism connected to the basal body; and
a control system set in the basal body and configured to process the image and the audio, to compare the image and the audio processed with the image and the audio stored in the memory to gain a corresponding instruction, and to control the rotating mechanism which in turn drives the interactive personal robot;
wherein the rotating mechanism comprises a shell, a bearing plate, and a first driver, the basal body comprises an end surface and defines a receiving cavity extending through the end surface, the bearing plate is fixed in the receiving cavity, one end of the first driver is fixed on the bearing plate, the other end of the first driver is connected to the shell to drive the shell to move.

2. The interactive personal robot of claim 1, wherein the rotating mechanism comprises a first guide rail, a second guide rail, two second drivers, and two balls, the first guide rail and the second guide rail are fixed in the receiving cavity; the two second drivers are assigned at an end of the first guide rail and an end of the second guide rail and are connected to the two balls respectively, the two second drivers drive the two balls to move along the first guide rail and the second guide rail respectively, thereby making a position of the barycenter of the interactive personal robot change to make the interactive personal robot tilt or rotate.

3. The interactive personal robot of claim 2, wherein the structure of the first guide rail and the structure of the second guide rail are the same.

4. The interactive personal robot of claim 2, wherein a first balance weight is located on an end of the first guide rail opposite to another end of the first guide rail where the corresponding second driver is located on; a second balance weight is located on an end of the second guide rail opposite to another end of the second guide rail where the corresponding second driver is located on; a position of the first balance weight and a position of the corresponding driver are symmetrical relative to a geometric center of the first guide rail; a position of the second balance weight and a position of the corresponding driver are symmetrical relative to a geometric center of the second guide rail.

5. The interactive personal robot of claim 2, wherein a weight of the first balance weight and a weight of the second balance weight correspond to a weight of the two second drivers respectively.

6. The interactive personal robot of claim 1, wherein the rotating mechanism comprises two driving rolls and two universal wheels, when the first driver drives the shell to move in a direction away from the ground, the two driving rolls and the two universal wheels touch the ground and are able to move.

* * * * *